United States Patent
Comaniuk et al.

(10) Patent No.: US 9,499,317 B2
(45) Date of Patent: Nov. 22, 2016

(54) BANDING STRAP (71) Applicant: Kwik Bandit Inc., Whitecourt (CA)

(72) Inventors: Ryan Comaniuk, Whitecourt (CA);
Lucien Dnestrianschii, St. Albert (CA);
Joseph B Marcos, Edmonton (CA);
Paul Comaniuk, Calgary (CA)

(73) Assignee: Kwik Bandit Inc., Whitecourt, Alberta (CA)

( * ) Notice: Subject to any disclaimer, the term of this patent is extended or adjusted under 35 U.S.C. 154(b) by 0 days.

(21) Appl. No.: 14/414,777

(22) PCT Filed: Jul. 2, 2013

(86) PCT No.: PCT/CA2013/050511
§ 371 (c)(1),
(2) Date: Jan. 14, 2015

(87) PCT Pub. No.: WO2014/012178
PCT Pub. Date: Jan. 23, 2014

(65) Prior Publication Data
US 2015/0166236 A1    Jun. 18, 2015

(30) Foreign Application Priority Data
Jul. 16, 2012 (CA) ..................................... 2783353

(51) Int. Cl.
*B65D 63/10* (2006.01)
*F16L 3/137* (2006.01)
(Continued)

(52) U.S. Cl.
CPC ......... *B65D 63/1027* (2013.01); *B60P 7/0823* (2013.01); *F16L 3/137* (2013.01); *F16L 3/233* (2013.01); *Y10T 24/14* (2015.01)

(58) Field of Classification Search
CPC ..... B60P 7/0823; B60P 7/0807; F16L 3/137; F16L 3/233; B65D 2563/105; B65D 63/1072; B65D 63/1081; B65D 63/1027; Y10T 24/1498; Y10T 24/3913; Y10T 24/14; Y10T 24/15; Y10T 24/153; Y10T 24/316; Y10T 24/3904; Y10T 403/7037; Y10T 70/409; Y10T 24/2175; Y10T 24/314; Y10T 24/3916; Y10T 24/4755; G09F 3/0352; B65H 75/36
USPC ... 24/16 PB, 16 R, 30.5 P, 30 R, 116 A, 128, 24/129 R, 300, 301, 265 H
See application file for complete search history.

(56) References Cited

U.S. PATENT DOCUMENTS 2,440,012 A   4/1948  Haver
3,086,265 A   4/1963  Orenick et al.
(Continued)

FOREIGN PATENT DOCUMENTS

EP   0270931 A1   6/1988
GB   1056740      1/1967
(Continued)

OTHER PUBLICATIONS

European Search Report issued in corresponding European Patent Application No. 13819276.0 dated May 23, 2016, 7 pages.

*Primary Examiner* — Robert J Sandy
*Assistant Examiner* — David Upchurch
(74) *Attorney, Agent, or Firm* — Davis & Bujold PLLC; Michael J. Bujold (57) ABSTRACT

A banding strap has an elongate member made from a flexible, resilient material. The elongate member has a stop section and a seat section. The stop section has one or more stops spaced along elongate member and each stop has a diameter that is greater than a diameter of elongate member. The seat section defines a seat that faces the stop section along the elongate member and a gap above the seat relative to the elongate member that is sized to receive the elongate member. The gap has a width that is less than diameter of the one or more stops. The seat defines a cavity that restrains one of the stops against a force applied along the elongate member. The stop section engages the seat section by bending the elongate member around such that the elongate member is substantially parallel to itself at the stop section and the seat section.

24 Claims, 10 Drawing Sheets

(51) Int. Cl.
*F16L 3/233* (2006.01)
*B60P 7/08* (2006.01)

(56) References Cited

U.S. PATENT DOCUMENTS

| | | | | |
|---|---|---|---|---|
| 3,422,499 | A * | 1/1969 | Merser | G09F 3/14 |
| | | | | 24/16 PB |
| 3,466,077 | A * | 9/1969 | Moberg | G09F 3/0352 |
| | | | | 24/16 PB |
| 3,597,803 | A * | 8/1971 | Van Neil | B65D 63/1027 |
| | | | | 24/16 PB |
| 3,712,655 | A * | 1/1973 | Fuehrer | F16B 21/071 |
| | | | | 24/16 PB |
| 3,780,400 | A | 12/1973 | Hinsperger | |
| 4,059,300 | A * | 11/1977 | Moberg | G09F 3/0352 |
| | | | | 24/16 PB |
| 4,093,288 | A * | 6/1978 | Suzuki | F16B 2/08 |
| | | | | 24/16 PB |
| 4,232,427 | A * | 11/1980 | Mawhinney | A44B 1/185 |
| | | | | 24/103 |
| 4,240,183 | A * | 12/1980 | Sumimoto | F16B 21/088 |
| | | | | 24/16 PB |
| 4,263,697 | A * | 4/1981 | Speedie | B65D 63/1081 |
| | | | | 24/16 PB |
| D265,055 | S * | 6/1982 | Bone | D8/394 |
| 4,466,160 | A | 8/1984 | de Lima Castro Netto | |
| 4,586,570 | A * | 5/1986 | Swift | A62C 13/76 |
| | | | | 169/75 |
| 4,711,002 | A * | 12/1987 | Kreeger | B65D 63/1027 |
| | | | | 24/16 PB |
| 4,785,563 | A * | 11/1988 | Friedman | G09F 3/00 |
| | | | | 40/301 |
| 4,854,014 | A * | 8/1989 | Ueno | B65D 63/1081 |
| | | | | 24/16 PB |
| 4,991,265 | A | 2/1991 | Campbell et al. | |
| 5,056,837 | A * | 10/1991 | Fuehrer | B65D 63/1081 |
| | | | | 292/307 R |
| 5,222,701 | A | 6/1993 | Rowland | |
| D346,954 | S * | 5/1994 | Vandermast | D8/382 |
| 5,370,661 | A * | 12/1994 | Branch | A61B 17/0401 |
| | | | | 24/16 R |
| 5,568,952 | A * | 10/1996 | Ruegg | B65D 63/1081 |
| | | | | 292/307 A |
| 5,673,464 | A | 10/1997 | Whittaker | |
| 5,722,260 | A * | 3/1998 | Mangano | A44C 5/209 |
| | | | | 24/71 J |
| D421,896 | S * | 3/2000 | Hamernik | D8/382 |
| 6,174,006 | B1 * | 1/2001 | Burt | B65D 63/1081 |
| | | | | 24/16 PB |
| 6,449,808 | B1 * | 9/2002 | Zappa | G09F 3/037 |
| | | | | 24/16 PB |
| D472,135 | S * | 3/2003 | Labbe | D8/394 |
| 6,550,829 | B1 * | 4/2003 | Dobson | G09F 3/0317 |
| | | | | 292/327 |
| 7,559,587 | B2 * | 7/2009 | Mangone, Jr. | G09F 3/037 |
| | | | | 24/16 PB |
| 7,805,816 | B1 | 10/2010 | Thorne, III et al. | |
| 2001/0013277 | A1 * | 8/2001 | Galkiewicz | A44B 18/0053 |
| | | | | 100/2 |
| 2011/0103914 | A1 * | 5/2011 | Coleman | B60P 7/0807 |
| | | | | 410/98 |
| 2014/0290011 | A1 * | 10/2014 | Gallup | B65D 63/02 |
| | | | | 24/30.5 R |
| 2014/0325799 | A1 * | 11/2014 | Frizzell | H02G 3/32 |
| | | | | 24/16 R |

FOREIGN PATENT DOCUMENTS

| | | |
|---|---|---|
| GB | 1083694 | 9/1967 |
| GB | 1533053 | 11/1978 |
| JP | S5461891 U | 4/1979 |
| WO | 2008027042 A1 | 3/2008 |

* cited by examiner

BANDING STRAP

FIELD

This relates to a banding strap, such as a strap that is used to band items.

BACKGROUND

Banding or tie straps are used in many different areas to restrain items, or to keep items together. Some examples of situations where banding is used include: storing cords and hoses; grouping elongate objects such as hockey sticks, golf clubs, etc.; installing hoses, cables or cords along scaffolding or railings; and other areas. This banding may be done using a zip tie, tape, bungee cords, etc. An example of a cargo strap can be found in U.S. Pat. No. 7,805,816 (Thorne, III et al.) entitled "Cargo Strap". Another example can be found in U.S. Pat. No. 5,673,464.

SUMMARY

There is provided a banding strap that has an elongate member made from a flexible, resilient material. The elongate member has a length, a diameter, a stop section and a seat section. The stop section has one or more stops spaced along the elongate member. Each stop has a diameter that is greater than the diameter of the elongate member. The seat section defines a seat that faces the stop section along the elongate member and a gap above the seat relative to the elongate member that is sized to receive the elongate member. The gap has a width that is less than the diameter of the one or more stops. The seat defines a cavity that, when a stop is received, restrains one of the one or more stops against a force applied along the length of the elongate member. The stop section engages the seat section by bending the elongate member such that the elongate member overlaps itself at the seat section.

In an aspect, there are a plurality of stops spaced along the stop section which allows a single banding strap to be used for strapping together bundles of items with different diameters.

In an aspect, each stop is a spherical shape and the seat has a portion of a spherical cavity.

In an aspect, the seat section may be removably attached to the elongate member or may be integrally formed with the elongate member.

In an aspect, the seat section is made from the same material as the stop section of the banding strap.

In an aspect, the gap is defined by two protrusions formed from a resilient material.

In an aspect, the cavity has a radial portion that receives the stop in a radial direction relative to the elongate member and an axial portion that receives the stop in an axial direction relative to the elongate member.

In an aspect, the radial portion may be recessed within the diameter of the elongate member.

In an aspect, the elongate member also has a handle section adjacent to the seat section such that the seat section is between the handle section and the stop section.

In an aspect, the gap is sized to receive the elongate member in a stretched state such that the diameter of the elongate member is reduced.

There is provided, in combination, an elongate member and a seat section. The elongate member is made from a flexible, resilient material and has a plurality of stops spaced along the elongate member. Each stop has a diameter that is greater than a diameter of the elongate member. The seat section has an attachment with a first cavity that receives the elongate member. The seat section also has a seat with a second cavity that is sized to receive one of the stops and a gap above the seat relative to the elongate member that is sized to receive the elongate member and is less than the diameter of the one or more stops.

In an aspect, the seat section also has a locking member that locks the attachment onto the elongate member.

In an aspect, the locking member may be integrally formed with the attachment or the locking member can be separate and distinct from the seat section.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A banding strap generally identified by reference numeral 10, will now be described with reference to FIG. 1 through 17.

Figure 1:
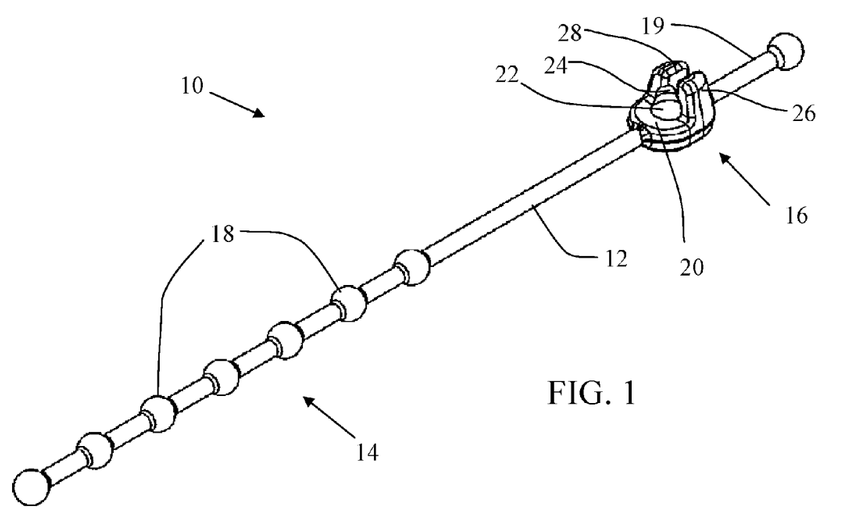
FIG. 1 is a top perspective view of a banding strap.
Figure 2:
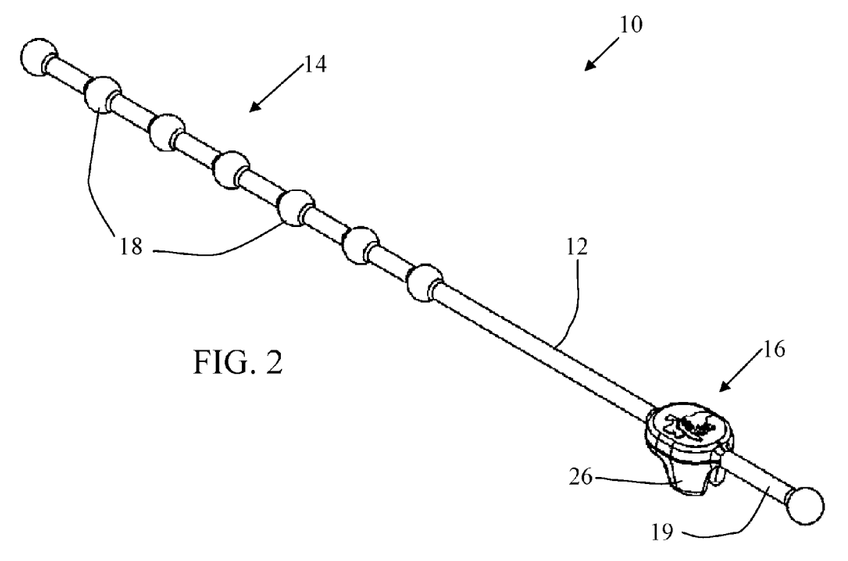
FIG. 2 is a bottom perspective view of the banding strap shown in FIG. 1.

Structure and Relationship of Parts:

Referring to FIGS. 1 and 2, banding strap 10 has an elongate member 12 made from a flexible, resilient material. As used herein, the terms "band" or "banding" are used to include any situation where strap 10 is wrapped around one or more items, and may be considered equivalent to bundling, bunching, baling, or otherwise securing or packaging multiple items together or securing single items. Preferably, elongate member 12 is made from rubber or a material with properties similar to rubber. The actual material will depend on the intended uses of the product, the size, etc. Elongate member 12 is shown as being relatively thin and narrow and having a round cross-section. Elongate member 12 may also be designed with other cross-sections, such as a rectangular, oval, rectangular with rounded edges, etc, and may be thin or tape-like. The actual design of elongate member 12 will depend on the intended use and the preferences of the user. Elongate member 12 is designed to have a two part connector with a stop section 11 and a seat section 16. Stop section 14 is shown as having a number of stops 18 spaced along elongate member 12. This allows the size of banding strap 10 to be adjusted according to what is being secured, although a single stop 18 may be used if the size is known. Each stop 18 protrudes radially from elongate member 12. In other words, each stop 18 has a diameter that is greater than the diameter of elongate member 12. As will be described below, stops 18 engage seat section 16 and the shape of stop 18 must be capable of being engaged and held by seat section 16. Accordingly, while stops 18 are shown as being generally spherical in shape, they may take other sizes and shapes as well, such as rectangular, conical, pyramidal, etc. in various orientations, as will be recognized by those skilled in the art.

Figure 15:
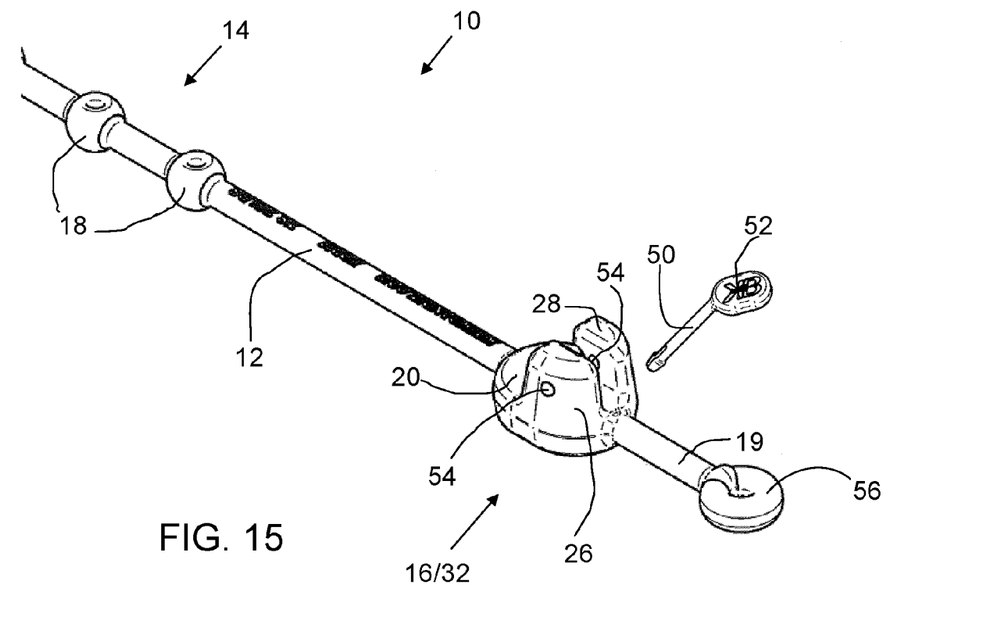
FIG. 15 is a perspective view of a banding strap with a variation of a handle, seat section and a locking pin.
Figure 16:
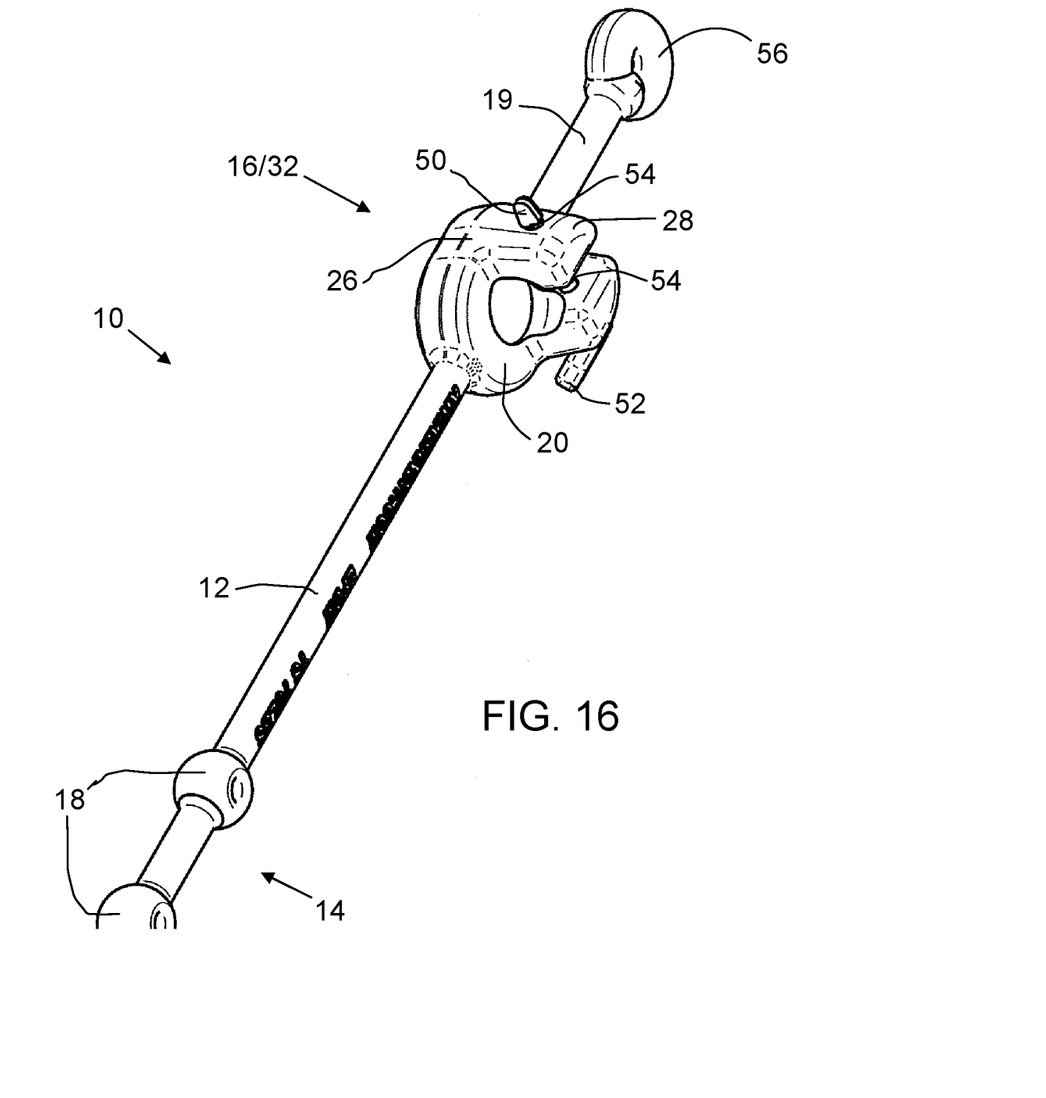
FIG. 16 is a side perspective view of the banding strap with the variation of FIG. 15 with the locking pin inserted.
Figure 17:
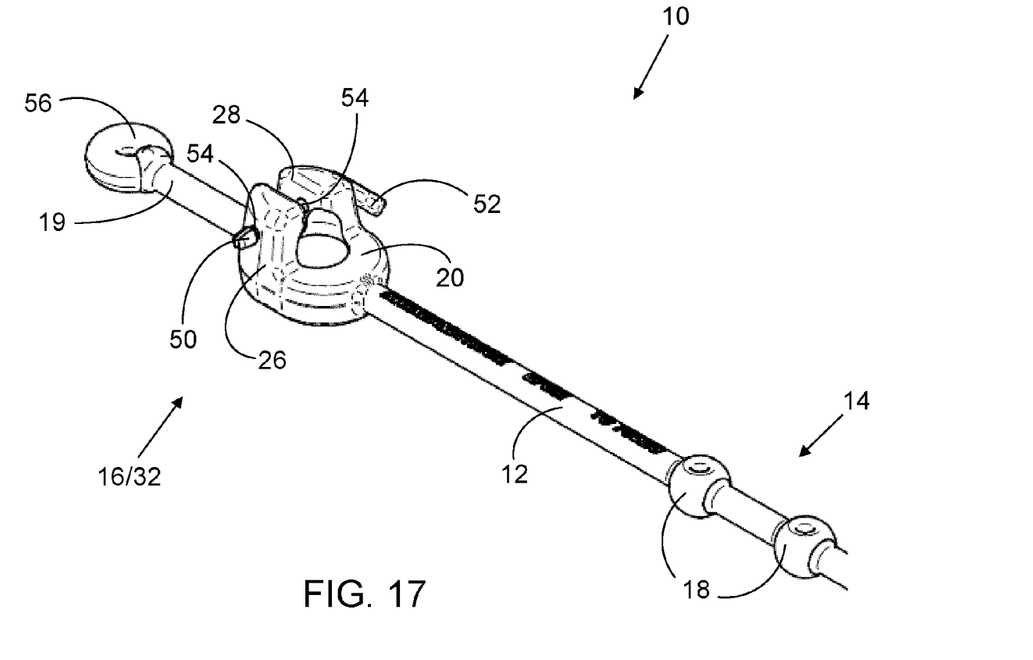
FIG. 17 is a perspective view of the banding strap with the variation of FIG. 15 with the locking pin inserted.

Elongate member 12 may also have an additional handle 19 that extends out from seat section 16 opposite stop section 14. This is intended to make banding strap 10 easier to handle while being engaged and disengaged. It will be understood that handle 19 may take various forms, although it is preferred that handle 19 be small enough that it does not become an obstruction as well as an aid. FIG. 15-17 show an alternate embodiment of handle 19 that has a ring shaped structure 56 at the end of the handle. One of the benefits of the ring shaped structure 56 is that banding strap 10 can be suspended from a hanger.

Figure 3:
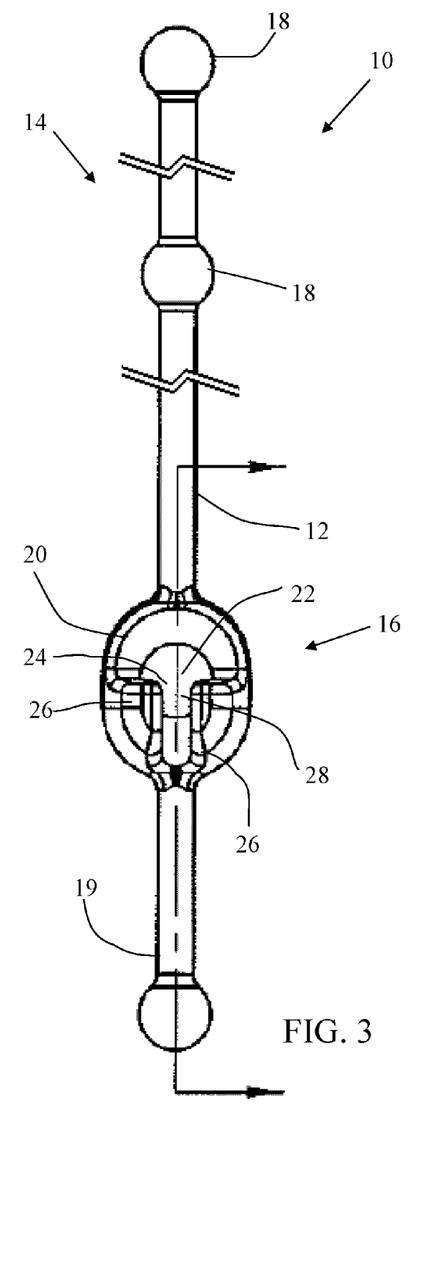
FIG. 3 is a top plan view of the banding strap shown in FIG. 1.
Figure 8:
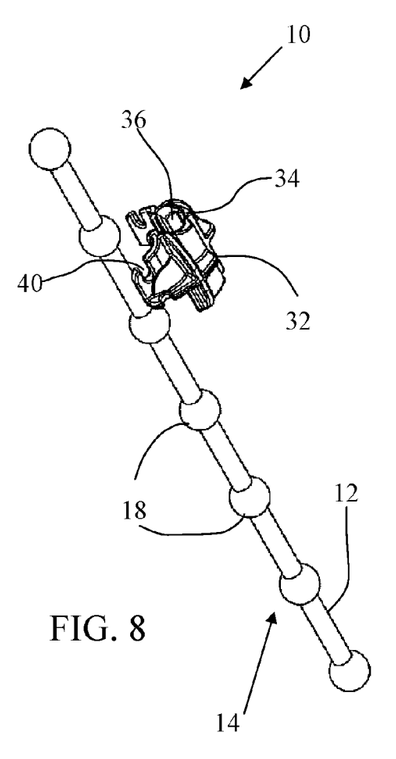
FIG. 8 is a side perspective view of a banding strap with a removable seat section.

Seat section 16 is designed to be complementary to stops 18 in stop section 14 in order to receive and retain stops 18. As shown in FIG. 3, seat section 16 is integrally formed with elongate member 12 and is made from the same material. It will be understood that seat section 16 may be made from a different material that is molded into elongate member 12, or may be a separate component altogether, such as is shown in FIG. 8. Even if seat section 16 is made as a separate component, it may still be made from the same or different material than elongate member 12. The variation shown in FIG. 8-12 will be discussed below.

Figure 4:
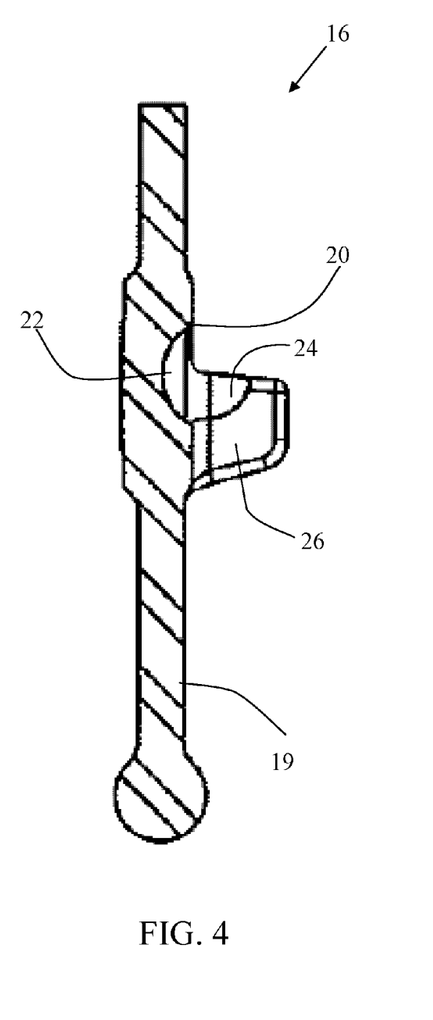
FIG. 4 is a side elevation view in section of the seat portion of the banding strap shown in FIG. 1.
Figure 5:
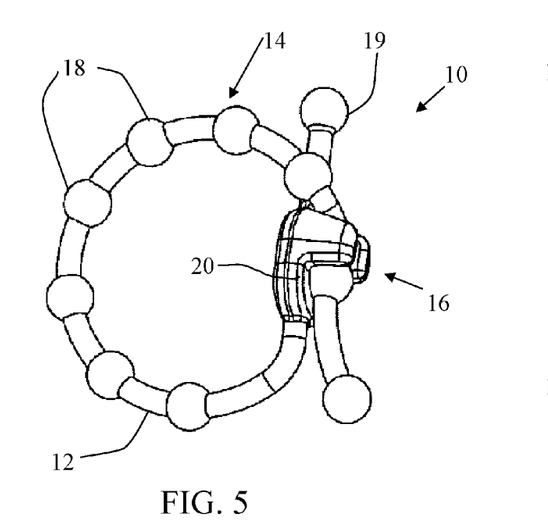
FIG. 5 is a perspective view of the banding strap of FIG. 1 in a connected orientation.
Figure 6:
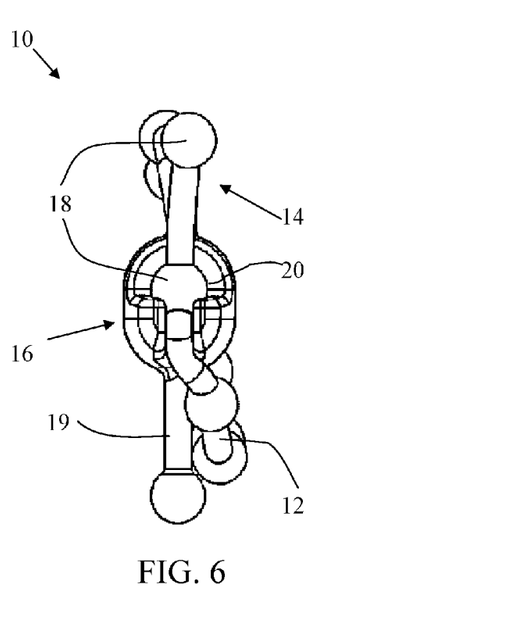
FIG. 6 is a top plan view of the banding strap of FIG. 1 in the connected orientation.

Referring to FIG. 3, seat section 16 defines a seat 20 that is oriented toward stop section 14 along elongate member 12. Seat 20 is preferably shaped to snugly receive one of stops 18, although it may have a different shape than stops 18, as long as it is able to retain stops 18 under normal operating conditions. Referring to FIG. 4, seat 20 is depicted as having a radially depressed portion 22 that extends downward into elongate member 12. Seat 20 also includes an axially depressed portion 24 that is above radially depressed portion 22 relative to elongate member 12. As can be seen in FIGS. 5 and 6, when stop 18 is engaged within seat 20, stop 18 becomes seated within the radially and axially depressed portions 22 and 24, which grip stop 18 under normal operating conditions. Radially depressed portion 24 allows elongate member 12 to lie closer to itself, or in other words to allow banding strap 10 to lie flatter in the engaged position, as can be seen in FIG. 5. It also increases the surface area that engages stop 18, which increases the friction and hence the engagement. However, stop 18 is primarily held in place by axially depressed portion 24. Referring again to FIGS. 3 and 4, axially depressed portion 24 is formed by upstanding members 26 that curve over at the top to form axially depressed portion 24. When stop 18 is engaged within seat 20, this holds stop 18 in place against forces applied along elongate member 12.

Figure 7:
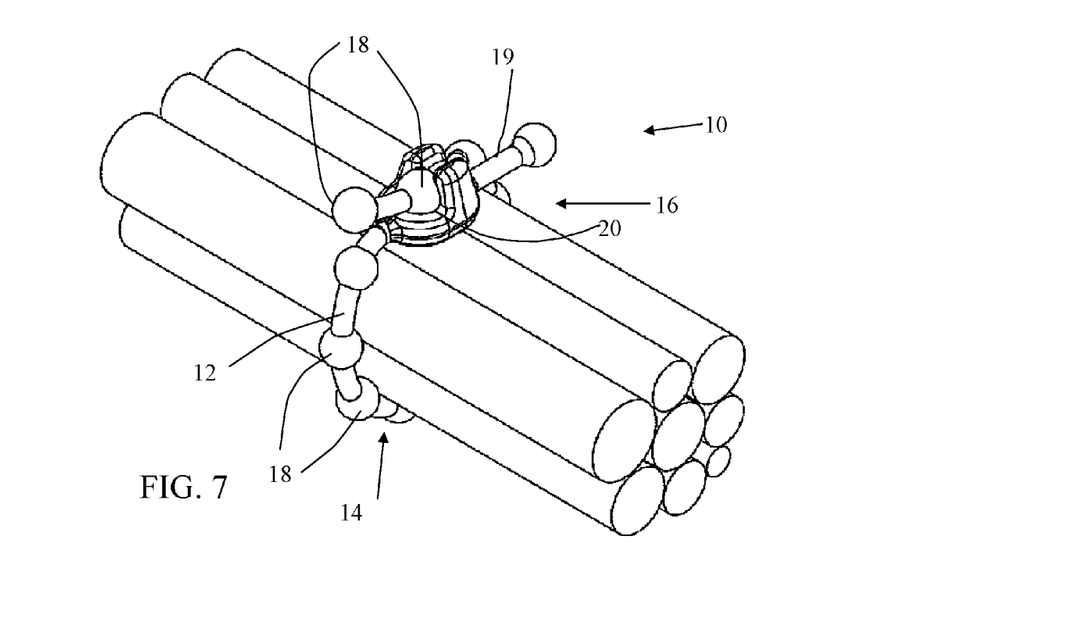
FIG. 7 is a perspective view of the banding strap shown in FIG. 1 banding items together.

In order to allow stops 18 to be engaged within seat 20, seat section 16 has a gap 28 that is above seat 20 relative to elongate member 12. Gap 28 has a width that is sized to receive elongate member 12, but that is less than the diameter of stops 18. When seat section 16 is made from a resilient material, it may be desired to make gap 28 very close to the diameter of elongate member 12 or even narrower than elongate member 12 in order to provide additional strength to seat section 16. In this design, it is intended that elongate member 12 will pass through gap 28 when elongate member 12 is stretched around an object, which will generally be necessary when banding an article or multiple articles together. As elongate member 12 is stretched, it also narrows. In addition, if seat section 16 is made from a resilient material, upstanding members 26 may spread apart slightly as elongate member 12 is pulled through gap 28, allowing stop 18 to become seated within seat 20. In this manner the holding force on stop 18 may be increased. Preferably, gap 28 is parallel to the direction of elongate member 12, which makes it easier to insert when being wrapped around an object or objects to be bound, as elongate member 12 generally ends up being substantially parallel to itself when engaged, as can be seen in FIGS. 6 and 7. It will be understood that gap 28 need not be parallel or extend directly upward from seat portion 16 as shown, and could be at an angle, such as by providing a side or angled entry into seat 20.

Referring to FIG. 7, banding strap 10 is preferably used by holding seat portion 16 adjacent to an article or articles to be bound, and wrapping stop portion 14 around the articles. As stop portion 14 approaches seat portion 16, tension is applied to elongate member 12, causing it to stretch until a stop 18 has been pulled past stop portion 14. Elongate member 12 is then lowered through gap 28 and the tension on elongate member 12 is released until stop 18 drops into seat 20. The angle of the elongate member 12 and the tension in elongate member 12 keeps stop 18 pressed down and into seat 20 to hold it in place. It has been found that it is generally easier to engage stop 18 into seat 20 when elongate member 12 is in tension and wrapped around one or more articles to be bound. Banding strap 10 is preferably designed as a light-duty attachment, and may be designed to withstand, for example, up to about 50 lb or up to 100 lb of pressure before releasing. The amount of force that banding strap 10 is able to withstand may be varied depending on the design, and also by providing a locking mechanism, as will be described below. The rating of banding strap 10 will depend on the design and the preferences of the user. Banding strap 10 may be designed for general purpose binding where great forces are not required to keep objects bound, but merely sufficient force to keep elongate objects together. Examples of household situations include binding a patio umbrella in the closed position, securing a coiled hose or electrical cord, securing long rods, sticks, boards, hockey sticks, etc. Banding straps 10 may also be used in industrial situations, such as to mount electrical cables to scaffolding, temporarily binding cable or wires together along the ground, etc. Banding strap 10 may also be used in garments, for medical or first aid purposes, etc. Other uses will be recognized by those skilled in the art. Each intended use may have different requirements and therefore may differ from the examples depicted in the attached drawings.

If a longer banding strap 10 is required, two or more may be 'daisy-chained' together by engaging a stop 18 on one banding strap 10 in the seat 20 of an adjacent banding strap. Banding strap 10 may be released by pulling up op the portion of elongate member 12 that extends past seat portion 16. If seat portion 16 is made from a resilient material, the upward force generally causes gap 28 to increase, allowing elongate member 12 to pass through, such that banding strap 10 may be released by a simple upward tug. A preferred design of banding strap 10 permits it to be released with one hand, or in other words, without having to apply opposing forces on both stop portion 14 and seat portion 16. If some or all of seat portion 16, is made from a rigid material, or if stops 18 are more deeply received within seat 20, it may be necessary to pull elongate member 12 as well to withdraw stop 18 from cavity 20. As shown, stop 18 is received within seat 20 only to the point that seat 20 is still engaged by an inclined surface. This makes it easier to pull out of seat 20. Generally speaking, banding strap 10 should be installed with some portion of elongate member 12 extending past seat portion 16 to act as a handle. Alternatively, another handle portion may be formed at the end of elongate member 12. This allows stops 18 to be pulled past seat 20 and dropped into place, as well as allowing the upward, releasing force to be applied. Once released, banding strap 10 can be reused.

Figure 13:
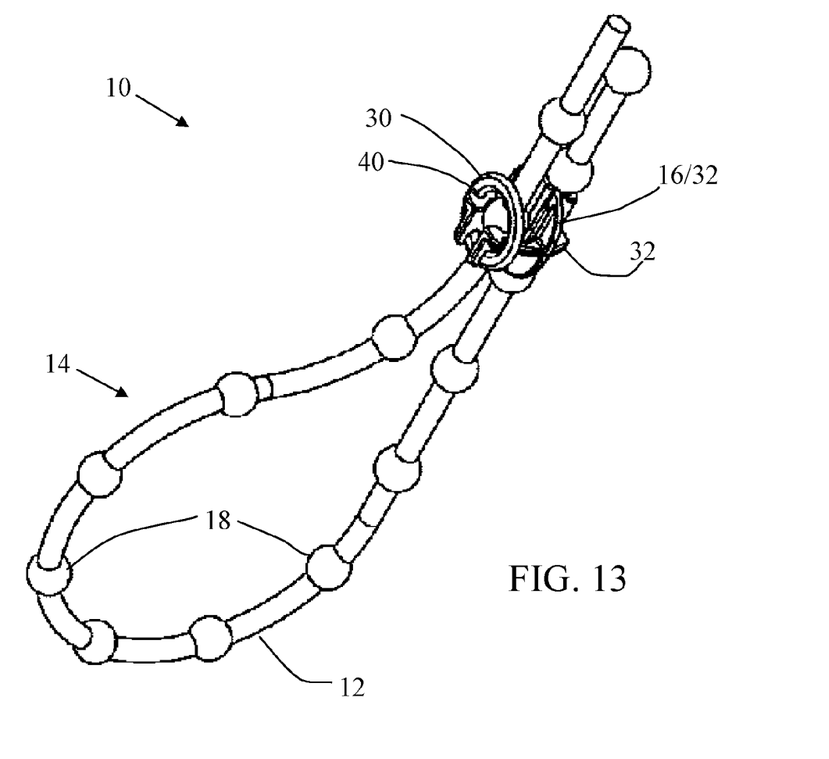
FIG. 13 is a perspective view of a banding strap with a variation of a seat section.
Figure 14:
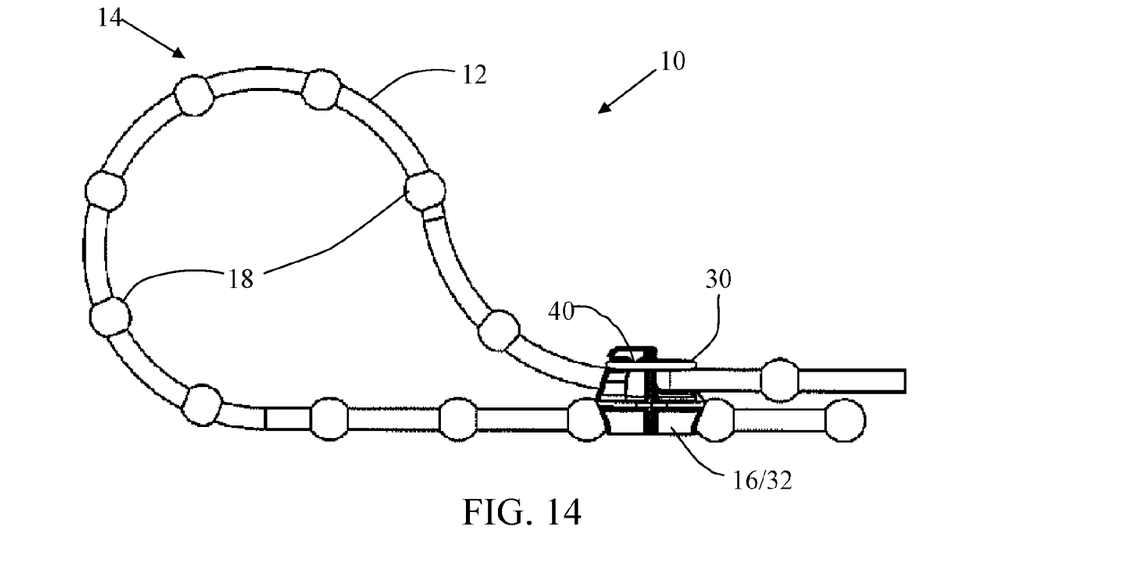
FIG. 14 is a side elevation view of the banding strap with a variation of a seat section shown in FIG. 13.

It will also be understood that, rather than wrapping elongate member 12 in a circle as shown in FIG. 5-7, it may also be folded back onto itself as shown in FIGS. 13 and 14. However, as there is no tension holding stop 18 in seat 20, this will generally not have the same binding force as in the configuration shown in FIG. 5-7. Instead, this is particularly useful if an additional locking element 30 is applied to seat portion 16, as shown in FIGS. 13 and 14. As depicted, locking element 30 is a ring that is installed above elongate member 12 and stop 18 when received by cavity 20. This prevents stop 18 from being withdrawn and accidentally releasing binding strap 10. It may also increase the structural strength of seat portion 16, particularly if it is made from a resilient material. In other circumstances, some part of elongate member 12 may be secured to a wall or item as a permanent attachment.

Figure 9:
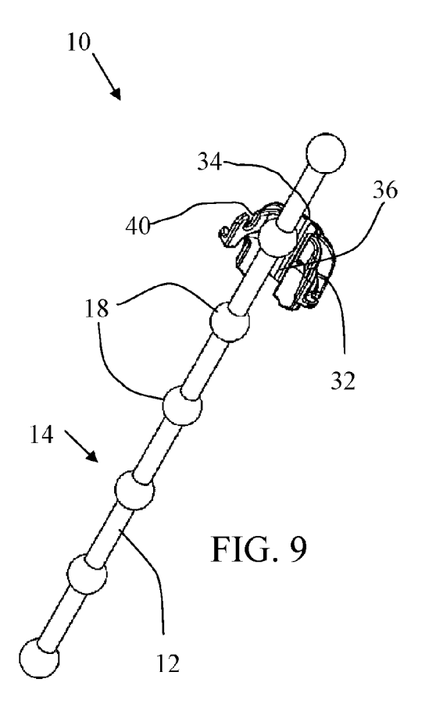
FIG. 9 is a bottom perspective view of the banding strap with a removable seat section shown in FIG. 8.
Figure 10:
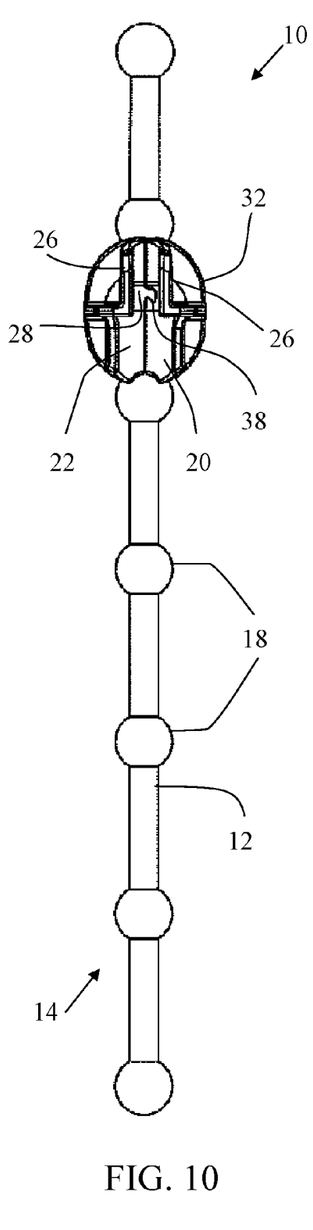
FIG. 10 is a top plan view of the banding strap with a removable seat section shown in FIG. 8.
Figure 11:
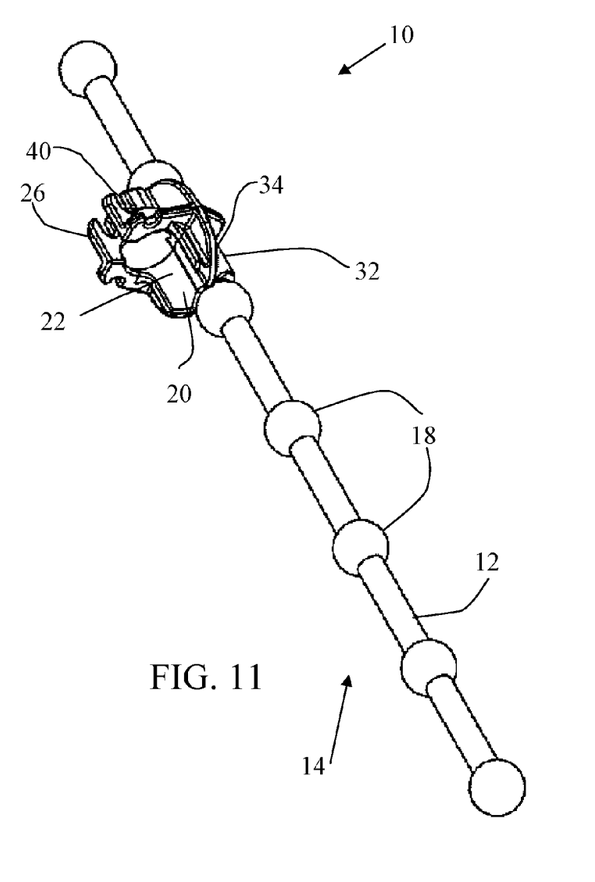
FIG. 11 is a top perspective view of the banding strap with a removable seat section shown in FIG. 8.

In the depicted example, locking element 30 is part of a seat portion 32 that is designed to be separate and distinct from elongate member 12 and installed at a desired position. As such, in addition to locking binding strap in the engaged position, it also helps lock seat portion 32 to elongate member 12. Referring to FIGS. 8 and 9, removable seat portion 32 has a hinged bottom 34 with a cavity 36 sized to receive elongate member 12 that allows it to be installed on elongate member 12. Referring to FIG. 10, removable seat portion 32 also has an engagement profile 38, such that it snaps together in the closed position. Referring to FIGS. 10 and 11, in the depicted example, removable seat portion 32 is installed between stops 18 along elongate member 12, such that it is prevented from sliding along the length of elongate member 12.

It will be understood that removable seat portion 32 may take different forms. For example, seat portion 32 may be designed to engage a stop 18 to increase the stability on elongate member 12. In another example, seat portion 32 may have an open bottom rather than hinged bottom 34, such that it is installed by pressing it down onto elongate member 12. There are various other designs that may involve clips or ties that may also be used to install seat portion 32 on elongate member 12.

Figure 12:
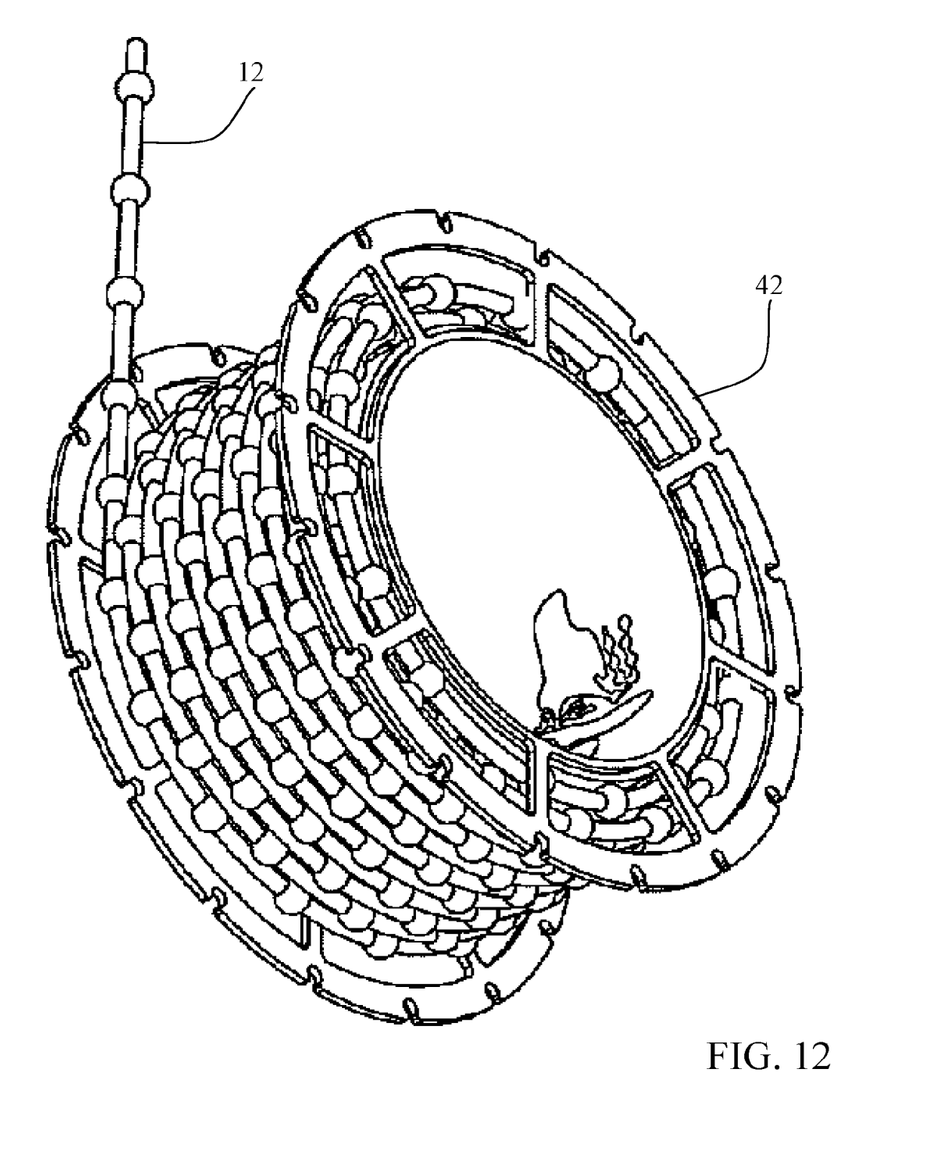
FIG. 12 is a perspective view of a banding strap on a reel.

One benefit of using removable seat portion 32 is that the length of elongate member 12 may be custom designed for a particular situation. Referring to FIG. 12, a continuous length of elongate member 12 may be stored on a reel 42. A selected length of elongate member 12 is selected by pulling it of reel 42, and cutting elongate member 12 to the desired length. Referring to FIGS. 9 and 11, seat portion 32 is attached as described above. Referring to FIG. 13-16, once stop 18 engages seat 20, a locking member, such as a ring 30 as shown in FIGS. 13 and 14 or a pin 50 as shown in FIGS. 15 and 16 may be installed. Another benefit of using removable seat portion 32 is that the orientation may change, such that elongate member 12 may be folded over as shown in FIGS. 13 and 14, or it may be looped as shown in FIG. 5-7. In either situation, seat 20 will be properly oriented to receive stop 18.

As shown in FIGS. 11 and 13, locking member 30 engages a recess 40 in seat portion 32. This helps keep seat portion 32 together, and also helps secure elongate member 12 or stop 18 within seat portion 32. Locking member 30 is shown as a ring, and may be designed to be removable, such as by using looser tolerances, an elastic material, rounded edges, etc. Alternatively, locking member 30 may be designed to be permanent. In this context "permanent" means not removable without breaking locking member 30. For example, locking member 30 may be designed with a profile that allows it to be slid over top of seat portion 32 to engage recess 40, but that does not permit it to be removed. It may also be made with tighter tolerances, with sharp edges, from a more rigid material, etc.

While locking member 30 is shown in the context of removable seat portion 32, it may also be used on attached seat portion 16 shown and discussed previously. In this situation, locking member 30 would not be used to secure seat portion 16 onto elongate member 12, but rather to secure it in the engaged position. Again, this may be done in a removable or permanent way, depending on the preferences of the user. This will generally increase the amount of force that can be withstood, and will also reduce the likelihood of an accidental release, such as by accidentally brushing elongate member 12 when engaged. The permanent attachment may be used to make banding strap 10 tamper resistant, as locking member 30 may not be removed except by being broken or cut.

Referring to FIG. 15-17, a pin 50 may be used to lock binding strap in the engaged position and it may also help lock seat portion 32 to elongate member 12. Pin 50 has a handle 52 to aid the user with insertion and removal of pin 50 from the holes 54 in upstanding members 26. As shown in FIG. 16, pin 50 is inserted through holes 54 when binding strap 10 is in the engaged position. This prevents stop 18 from being withdrawn and accidentally releasing binding strap 10.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A banding strap, comprising:
an elongate member made from a flexible, resilient material, the elongate member having a length, a longitudinal axis defined along the length, a diameter, a stop section and a seat section, wherein:
the stop section comprises one or more stops spaced along the elongate member, each stop having an outer surface and a diameter that is greater than the diameter of the elongate member;
the seat section defines a seat that faces the stop section along the elongate member and a gap above the longitudinal axis of the elongate member that is sized to receive the elongate member, the gap having a width that is less than the diameter of the one or more stops, the seat defining a cavity that, when a stop is received, restrains one of the one or more stops against a force applied along the length of the elongate member;
the stop section engaging the seat section by bending the elongate member such that the elongate member overlaps itself at the seat section, and the elongate member being inserted through the gap in a direction perpendicular to the seat section;
the seat section comprising a radially depressed portion and two upstanding protrusions extending upwards from the radially depressed portion; and
a locking member engaging with the two upstanding protrusions of the seat section thereby securing the stop in engagement with the seat section.

2. The banding strap of claim 1, comprising a plurality of stops spaced along the stop section.

3. The banding strap of claim 1, wherein each stop comprises a spherical shape and the seat comprises a portion of a spherical cavity.

4. The banding strap of claim 1, wherein the seat section is removably attached to the elongate member.

5. The banding strap of claim 1, wherein the seat section is made from the same material as the stop section.

6. The banding strap of claim 5, wherein the seat section is integrally formed with the elongate member.

7. The banding strap of claim 1, wherein the gap is defined by the two upstanding protrusions formed from a resilient material.

8. The banding strap of claim 1, wherein the cavity comprises a radial portion that receives the stop in a radial direction relative to the elongate member and an axial portion that receives the stop in an axial direction relative to the elongate member, the radial portion and the axial portion are complementary to the shape of the stop, and the radial portion resists axial movement of the stop in both directions along the longitudinal axis when engaged by the stop.

9. The banding strap of claim 8, wherein the radial portion is recessed within the diameter of the elongate member.

10. The banding strap of claim 1, wherein the elongate member further comprises a handle section adjacent to the seat section, such that the seat section is between the handle section and the stop section.

11. The banding strap of claim 1, wherein the gap is smaller than the diameter of the elongate member such that the gap is sized to receive the elongate member when the elongate member is in a stretched state such that the diameter of the elongate member is reduced.

12. The banding strap of claim 1, further comprising the locking member that releasably secures the stop section in engagement with the seat section temporarily.

13. The banding strap of claim 12, wherein the locking member is one of a pin, ring, latch or clasp.

14. The banding strap of claim 1, further comprising the locking member that permanently secures the stop section in engagement with the seat section.

15. A banding strap comprising:
an elongate member made from a flexible, resilient material and comprising a plurality of stops spaced along the elongate member, each stop having a diameter that is greater than a diameter of the elongate member, the elongate member having a length and a longitudinal axis defined along the length;
a seat section comprising an attachment having a first cavity that receives the elongate member, the seat section further comprising a seat having a second cavity that is sized to receive one of the stops and a gap above the longitudinal axis of the elongate member that is sized to receive the elongate member and is less than the diameter of the one or more stops such that the stop section is engaged by the seat section, and the seat being spaced above the first cavity in a direction that is perpendicular to the longitudinal axis of the elongate member;
the seat section comprising a radially depressed portion and two upstanding protrusions extending upwards from the radially depressed portion; and
a locking member engaging with the two upstanding protrusions of the seat section thereby securing the stop in engagement with the seat section.

16. The banding strap of claim 15, wherein the locking member further locks the attachment onto the elongate member.

17. The banding strap of claim 16, wherein the locking member is integrally formed with the attachment.

18. The banding strap of claim 16, wherein the locking member is separate and distinct from the seat section.

19. The banding strap of claim 16, wherein the locking member further permanently locks the stop section in engagement with the seat section.

20. The banding strap of claim 16, wherein the locking member removably attaches the seat portion to the elongate member.

21. The banding strap of claim 20, wherein the locking member is one of a pin, ring, latch or clasp.

22. The banding strap of claim 16, wherein the locking member permanently attaches the seat portion to the elongate member.

23. The banding strap of claim 15, wherein the stop comprises a spherical shape and the seat comprises a portion of a spherical cavity.

24. The banding strap of claim 15, wherein the gap is smaller than the diameter of the elongate member such that the gap is sized to receive the elongate member when the elongate member is in a stretched state such that the diameter of the elongate member is reduced.

* * * * *